US011025138B2

(12) United States Patent
Blum et al.

(10) Patent No.: US 11,025,138 B2
(45) Date of Patent: Jun. 1, 2021

(54) ELECTRIC MACHINE

(71) Applicant: Bayerische Motoren Werke Aktiengesellschaft, Munich (DE)

(72) Inventors: Julian Blum, Munich (DE); Andreas Huber, Schoenberg (DE); Markus Lang, Munich (DE); Joerg Merwerth, Dachau (DE); Angusto Guccione, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/031,649

(22) Filed: Jul. 10, 2018

(65) Prior Publication Data

US 2018/0323685 A1 Nov. 8, 2018

Related U.S. Application Data

(63) Continuation of application No. PCT/EP2016/078371, filed on Nov. 22, 2016.

(30) Foreign Application Priority Data

Jan. 11, 2016 (DE) ..................... 10 2016 200 186.8

(51) Int. Cl.
*H02K 9/22* (2006.01)
*H02K 3/38* (2006.01)
*H02K 15/12* (2006.01)

(52) U.S. Cl.
CPC ................. *H02K 9/22* (2013.01); *H02K 3/38* (2013.01); *H02K 15/12* (2013.01)

(58) Field of Classification Search
CPC ............. H02K 9/22; H02K 3/38; H02K 15/12
USPC ....................................... 310/12.29
See application file for complete search history.

(56) References Cited

U.S. PATENT DOCUMENTS

| 2002/0089242 A1 | 7/2002 | Liang et al. |
| 2002/0135245 A1 | 9/2002 | Derleth et al. |
| 2009/0273254 A1 | 11/2009 | Heim |
| 2012/0001503 A1 | 1/2012 | Owng et al. |

(Continued)

FOREIGN PATENT DOCUMENTS

| CN | 104852481 A | 8/2015 |
| DE | 1 204 316 A | 11/1965 |

(Continued)

OTHER PUBLICATIONS

International Search Report (PCT/ISA/210) issued in PCT Application No. PCT/EP2016/078371 dated Feb. 2, 2017 with English translation (three (3) pages).

(Continued)

*Primary Examiner* — Terrance L Kenerly
(74) *Attorney, Agent, or Firm* — Crowell & Moring LLP

(57) ABSTRACT

An electric machine has a housing and has a stator inside the housing, surrounding a rotor arranged on a motor shaft so as to be fixed to the shaft. A rotary field winding, at the ends of the stator, forms a winding head. The winding heads are embedded in a thermally conductive encapsulation material, wherein the encapsulation material is in thermal contact with the housing along the outer circumference of the winding head. A segmented cooling plate is arranged on the inner circumference of the encapsulation winding head.

7 Claims, 2 Drawing Sheets

(56) References Cited

U.S. PATENT DOCUMENTS

2014/0265654 A1* 9/2014 Satterfield ............... H02K 9/22
  310/52
2014/0292116 A1* 10/2014 Poulin ..................... H02K 3/38
  310/52

FOREIGN PATENT DOCUMENTS

| DE | 102 01 012 A1 | 7/2002 |
|---|---|---|
| DE | 101 14 321 A1 | 10/2002 |
| DE | 101 22 425 A1 | 11/2002 |
| EP | 2 113 991 A1 | 11/2009 |
| JP | 10-174371 A | 6/1998 |
| WO | WO 2014/056717 A2 | 4/2014 |

OTHER PUBLICATIONS

German-language Written Opinion (PCT/ISA/237) issued in PCT Application No. PCT/EP2016/078371 dated Feb. 2, 2017 (six (6) pages).

German-language Search Report issued in counterpart German Application No. 10 2016 200 186.8 dated Jul. 14, 2016 with partial English translation (twelve (12) pages).

Chinese Office Action issued in Chinese counterpart application No. 201680065940.6 dated Jun. 24, 2019, with English translation (Fourteen (14) pages).

* cited by examiner

ELECTRIC MACHINE

CROSS REFERENCE TO RELATED APPLICATIONS

This application is a continuation of PCT International Application No. PCT/EP2016/078371, filed Nov. 22, 2016, which claims priority under 35 U.S.C. § 119 from German Patent Application No. 10 2016 200 186.8, filed Jan. 11, 2016, the entire disclosures of which are herein expressly incorporated by reference.

BACKGROUND AND SUMMARY OF THE INVENTION

The invention relates to an electric machine having a housing and, within the housing, a stator which surrounds a rotor arranged fixedly on a motor shaft. The stator has a rotating-field winding which forms in each case one winding head at the face sides of the stator. The invention also relates to a motor vehicle equipped with an electric machine of said type.

Electric machines may serve as motors or generators in various technical applications, for example as a compressor or starter drive. Nowadays, high-power electric machines are used in particular as electric drive motors in hybrid or electric vehicles.

An electric motor of said type, which is in particular brushless, as an electric rotary current machine normally has at the stator side a stator laminated core. The stator laminated core has a number of stator teeth and stator grooves into which an electrical rotating-field winding in the form of individual stator coils is inserted, which in turn are wound from an insulating wire, that is to say a wire (copper wire) equipped with an insulating layer in the form, for example, of an insulating lacquer.

The coil windings are often arranged so as to run along the stator laminated core in a longitudinal direction (axial direction) between two opposite face ends of the stator, and so as to be diverted in looped fashion transversely with respect to said longitudinal direction at the face sides of the stator laminated core. Here, the stator may for example have coil bodies which are arranged on the stator teeth created by means of the stator grooves and around which the coil wire is wound in windings one on top of the other. Said region, in which the coil windings project beyond the stator laminated core in an axial direction and are diverted, is commonly referred to as a (stator-face-side) winding head.

For the mechanical fixing of the coil windings relative to one another and in relation to the respective coil body, it is customary for the components of the stator to be encapsulated with encapsulation material, such as for example an epoxy resin or a plastic, at least in the region of the winding heads. After the encapsulation material cures, the winding heads are mechanically and electrically protected by the encapsulation thus formed.

In the case of a brushless electric motor as a multi-phase rotary current machine, the stator has multiple (motor) phases and thus at least a corresponding number of phase conductors or coil wires as phase or coil windings. The coil windings are in each case charged with electrical current in a phase-offset manner in order to generate a magnetic rotating field, in which, customarily, a rotor or armature equipped with permanent magnets rotates.

During operation, the current gives rise inter alia to power losses in the form of heat, which occur inter alia owing to ohmic losses within the insulating wires. Said heat losses disadvantageously give rise to power losses of the electric motor, and can sometimes lead to melting of the insulating lacquer and/or of the encapsulation and thus to damage to the electric motor. For the reduction and dissipation of the generated heat losses, it is therefore necessary for the electric motor to be adequately cooled, or have heat removed therefrom to an adequate extent, during operation.

By means of the encapsulation, the stator coils are thermally insulated in the region of the winding heads, whereby the (coil) temperature is at its greatest in the winding head region. This "hot spot" reduces the continuous load capacity of the electric motor. To cool the winding heads, it is customary for the encapsulation to be coupled to a housing of the electric motor, and thus for the heat losses to be dissipated to the thermal mass of the housing. Here, it is for example known for heat to be removed from the housing by means of water-type and/or air-type cooling arrangements.

The connection to the housing is typically realized, in relation to the stator laminated core, radially at the outer side, and in part additionally by way of axial thermal contact of the encapsulation material with a housing faced side. To improve the cooling action, it is likewise customary for a dissipation of heat to be realized by way of a thermal connection of the radially inner surface of the winding head, in particular by way of cooling structures of the housing or ring-shaped or hollow cylindrical cooling plates. The cooling plates act as an additional heat-removal surface and are for example arranged within grooves of the encapsulation or are at least partially sunken into the encapsulation. The cooling plates are expediently produced from a metallic material with high thermal conductivity, in particular from an aluminum material.

On the one hand, the effectiveness of the removal of heat from the winding head encapsulation increases with decreasing distance of the winding head from the cooled housing or cooling plate. On the other hand, the magnetic rotating field of the rotating-field winding generates eddy currents in the electrically conductive surfaces of the cooling plate and of the housing, which eddy currents in turn act as additional heat sources and thereby impede the cooling of the encapsulation. In other words, the heat removal from the rotating-field winding is reduced, whereby the continuous load of the electric motor is limited.

The invention is based on the object of providing an electric machine which is improved with regard to a removal of heat from the winding heads. It is furthermore sought to provide a motor vehicle equipped with an electric machine of said type.

With regard to the electric machine, the stated object is achieved according to the invention by an electric machine having a housing and, within the housing, a stator which surrounds a rotor arranged fixedly on a motor shaft, the stator having a rotating-field winding which forms in each case one winding head at the face sides of the stator. The winding heads are embedded in a thermally conductive encapsulation material. The encapsulation material is, along an outer circumference of the winding head, in thermal contact with the housing. A segmented cooling plate is arranged on an inner circumference of the encapsulated winding head. With regard to the motor vehicle, the stated object is achieved according to the invention by a motor vehicle, in particular an electric or hybrid vehicle, having such an electric machine.

The electric machine according to the invention is designed for example as a permanently excited machine or as an asynchronous machine of a motor vehicle, in particular as a drive machine of an electric or hybrid vehicle. For this purpose, the electric machine comprises a housing having, within the housing, a stator which surrounds a rotor arranged fixedly on a motor shaft. The stator has a stator main body, to which a rotating-field winding is applied for the purposes of generating a magnetic rotating field that sets the rotor in rotation. The rotating-field winding is applied for example as a distributed (coil) winding to the stator main body.

The coils of the rotating-field winding project axially beyond the stator at its face sides, whereby in each case one winding head is formed. In other words, the winding head is that portion of the rotating-field winding which projects axially beyond the stator main body, that is to say the stator assembly or the stator laminated core, on both face sides. The winding heads are embedded in a thermally conductive encapsulation material, via which heat dissipation of the heat losses generated in the winding heads during motor operation takes place.

The encapsulation material is in thermal contact with the housing along an outer circumference of the respective winding head, that is to say radially at the outside, such that the heat losses are dissipated via the thermal mass of the housing for the purposes of cooling the electric machine. Below, thermal contact is to be understood to mean in particular heat-conducting contact between two or more materials, in the case of which heat transfer from one material into the other material occurs by means of convection.

On the radially inner side, the encapsulated winding head is in thermal contact, along an inner circumference, with a segmented cooling plate. The preferably strip-like or panel-like cooling plate is manufactured as a thermally conductive body composed of a metallic material. The cooling plate releases the heat absorbed from the encapsulation material for example to a cooling medium flowing around said cooling plate, such as for example air, such that the cooling plate and thus the encapsulation material and the respective winding head are cooled. Owing to the arrangement on the inner circumference of the encapsulation material, the cooling plate expediently has a substantially circular-ring-shaped or hollow cylindrical geometry. Owing to the segmentation, an induction of eddy currents in the electrically conductive surface of the cooling plate, owing to the magnetic rotating field during motor operation, is reduced or prevented entirely.

In other words, the expansive heat-removal surface of the cooling plate is broken up as a result of the segmentation, such that the current paths of the induced eddy currents are broken up. In this way, no significant eddy currents occur within the cooling plate during motor operation. Consequently, significantly reduced generation of heat in the cooling plate occurs during motor operation, such that the removal of heat from the encapsulation material and thus the winding heads in the direction of the cooling plate is improved. The improved removal of heat from the winding heads advantageously results in a reduction in power losses and in an increase in the continuous load of the electric machine.

As a result of the segmentation, the heat-removal surface of the cooling plate via which heat can be removed from the encapsulation material is reduced. From experience, however, the cooling of the winding head during motor operation is significantly improved through the avoidance of eddy currents and thus through the avoidance of additional heat generation within the cooling plate. In this way, a particularly effective dissipation of heat from the hot-spots of the winding heads is made possible, which in particular has an advantageous effect on the power potential and the service life of the electric machine. In this way, an electric machine with relatively increased drive power is realized in an identical structural volume.

The encapsulation material is for example an epoxy resin or a curable plastics material which is applied to the two opposite face sides of the stator for the long-term fixing of the winding heads. The cured encapsulation material forms, on the face side, in each case one substantially circular-ring-shaped encapsulation with a rectangular cross section, in which the wire profile of the winding heads is substantially fully accommodated. In addition to the connection to the housing at the outer circumferential side, the respective encapsulation is preferably in axial thermal contact with the associated housing face side. The cooling of the winding heads is further improved in this way.

In a suitable refinement, the segmentation of the cooling plate is formed by a number of recesses. The recesses of the cooling plate may in this case be filled for example with insulating material, that is to say an electrically non-conductive material. In a preferred embodiment, the recesses are formed in particular as preferably axial slots of the cooling plate. By means of the introduction or formation of slots or other insulation layers into the cooling plate, the eddy current losses and the resulting waste heat are significantly reduced.

Another aspect of the invention provides for a comb-like cooling plate with a number of plate teeth extending axially toward the opposite face side to be provided. The lamellar plate teeth are in this case created in particular by way of slot-like recesses during the course of the segmentation.

Owing to the segmentation, and the reduction of eddy current losses thus realized, it is possible for the cooling plate to be positioned closer to the winding head, such that the cooling action is further improved. For this purpose, in an advantageous embodiment, the cooling plate is arranged at least partially within the encapsulation material. In other words, the cooling plate is for example encapsulated together with the winding head in the encapsulation material.

In an expedient embodiment, the heat is removed from the housing by way of a cooling arrangement, in particular by a water-type cooling arrangement. The housing-side cooling of the encapsulation material is thereby improved, whereby the continuous load of the electric machine is further improved.

In a suitable embodiment, the cooling plate is produced from an aluminum material. In this way, the cooling plate is of particularly low weight and can be produced inexpensively, whereby the highest possible thermal conductivity is ensured at the same time.

In the preferred application, the electric machine is used in a motor vehicle. Here, the electric machine is preferably designed as an asynchronous machine, and is installed for example as an electromotive drive in an electric or hybrid vehicle. The electric machine is preferably designed and suitable firstly for generating a torque for vehicle propulsion and secondly for recuperating kinetic energy of the motor vehicle during operation and converting said energy into electrical energy for an energy store (generator operation).

Here, the improved continuous load of the electric machine has an advantageous effect on the running time of the drive and of an energy store coupled thereto. In this way, the traveling range of the motor vehicle equipped therewith is improved.

Other objects, advantages and novel features of the present invention will become apparent from the following detailed description of one or more preferred embodiments when considered in conjunction with the accompanying drawings.

Parts and dimensions which correspond to one another are always denoted by the same reference designations in all figures.

DETAILED DESCRIPTION OF THE DRAWINGS

Figure 1:
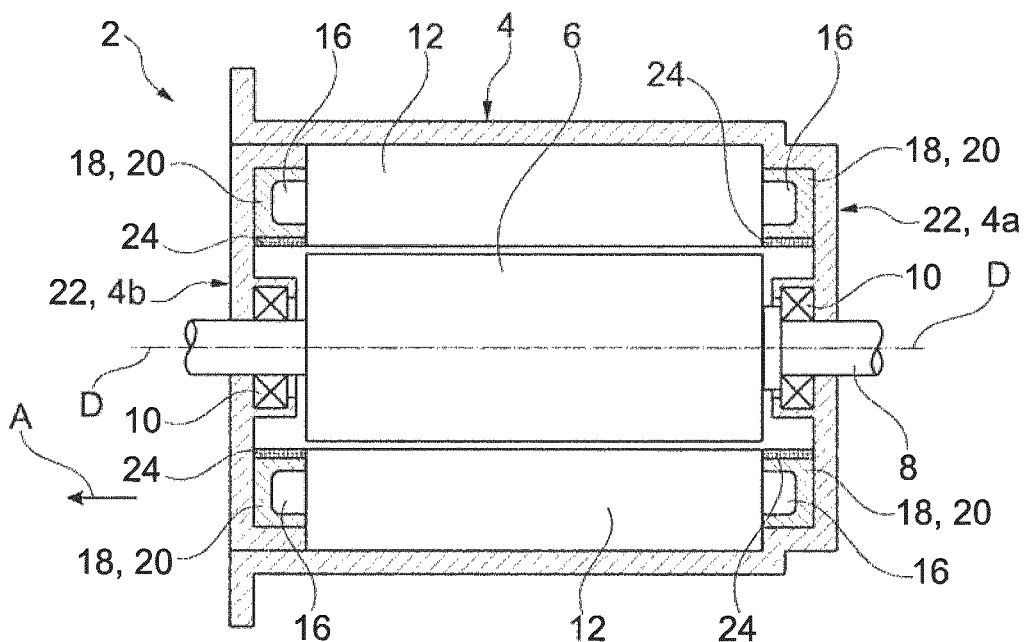
FIG. 1 shows, in a schematic sectional illustration, an electric machine having a housing and, within the housing, a stator and a rotor arranged fixedly on a motor shaft.

The electric machine 2 illustrated in FIG. 1 is an electromotive drive of an electric or hybrid vehicle. For this purpose, the electric machine 2 is expediently designed as an asynchronous machine, and is integrated within a drivetrain of the electric or hybrid vehicle. The electric machine 2 has a (motor) housing 4, in which a rotor 6 is mounted so as to be rotatable about an axis of rotation D.

Figure 2:
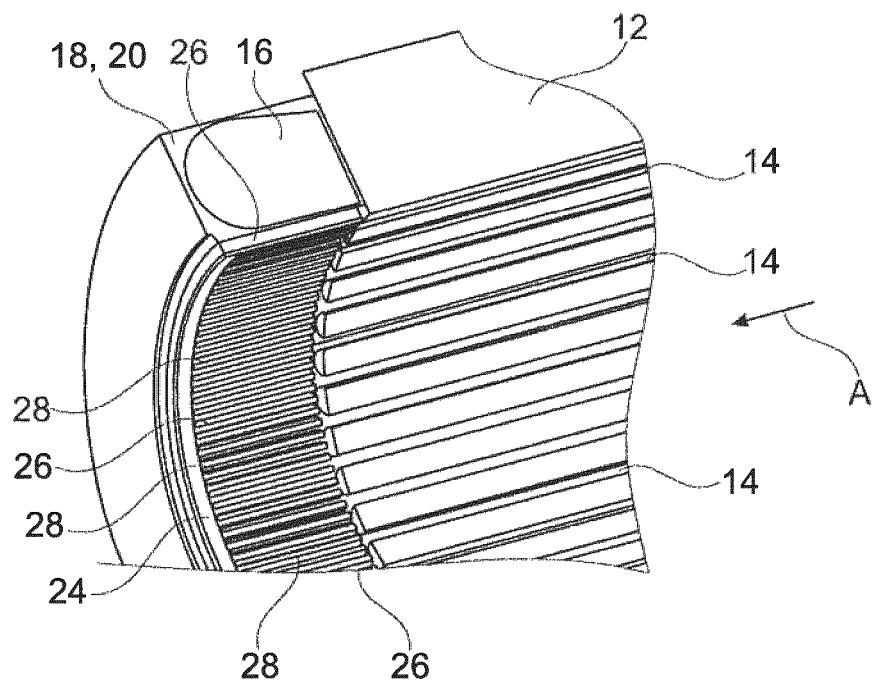
FIG. 2 shows, in a perspective illustration, a detail of a winding head region of the stator with a cooling plate and with an encapsulation.

The rotor 6 is arranged fixedly on a rotor or motor shaft 8, which is mounted by way of two bearings 10, at the opposite face sides of the housing 4, relative to the housing. The rotor 6 is surrounded, within the housing, by a stator 12. The stator 12 comprises a stator assembly or stator laminated core (not described in any more detail) with a number of axially running stator grooves 14 (see FIG. 2) on the inner circumferential side. The stator grooves 14 run in this case in particular along an axial direction A oriented substantially parallel to the axis of rotation D.

In the assembled state, there is inserted into the stator grooves 14 a distributed rotating-field winding, which is illustrated merely schematically by way of the winding heads 16. The rotating-field winding projects as a bow-like winding loop out of both opposite face sides of the stator 12, which winding loop forms the respective winding head 16 in said region.

During (motor) operation of the electric machine 2, the rotating-field winding is charged with an electrical rotary current. In this way, the rotating-field winding generates a magnetic rotating field, in which the rotor 6, which is customarily equipped with a permanent magnet, rotates about the axis of rotation D. The current gives rise, during operation, inter alia to power losses in the form of heat.

Figure 3:
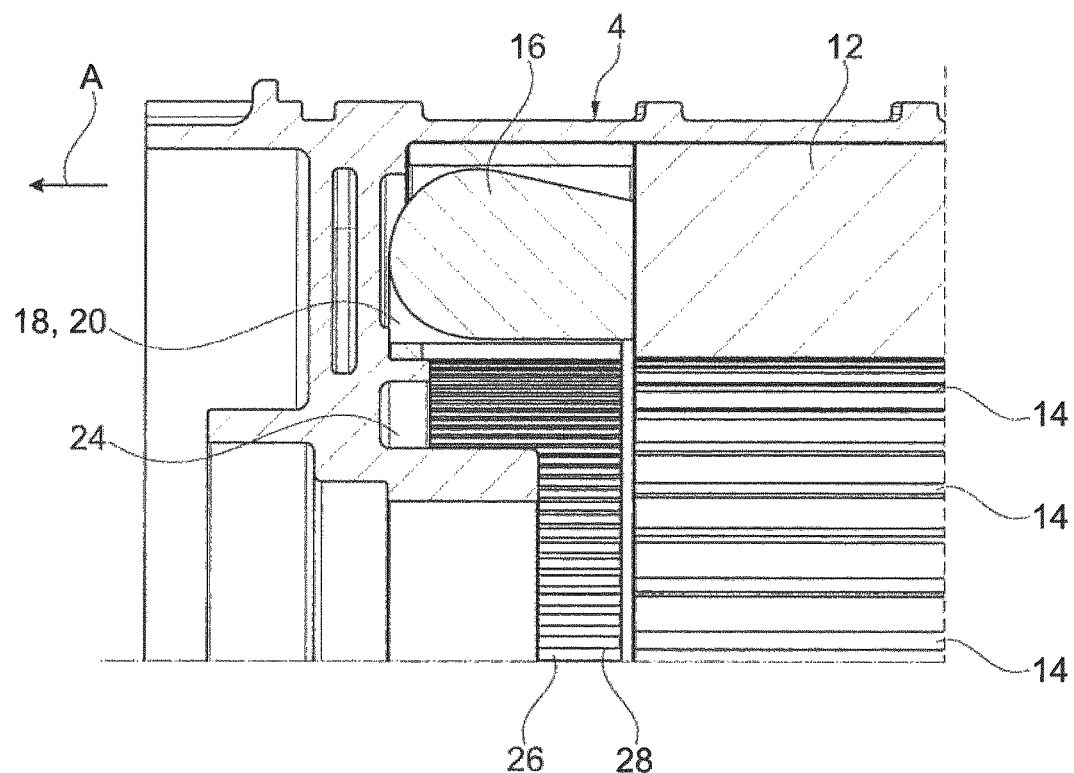
FIG. 3 shows the winding head in a sectional illustration.

The winding heads 16 are, for the purposes of dissipating the heat losses generated in the rotating-field winding during motor operation, embedded in an encapsulation 18. The encapsulation 18 is composed of a cured encapsulation material 20, in particular of an epoxy resin or a plastics material. By means of the encapsulation 18, the winding heads 16 are fixed in a mechanically and electrically protected manner to the stator 12. The encapsulation 18 is approximately circular and, as can be seen in particular in FIG. 2 and FIG. 3, has an approximately rectangular cross section, in which the respective winding head 16 is substantially fully received.

The encapsulation 18 is connected directly to the housing face sides 22 of the housing 4 along axial direction A, such that heat is dissipated from the encapsulation 18 outward to the housing 4. The housing face sides 22 are in this case formed in particular, on the one hand, by a housing base 4a of a pot-like housing main body, and on the other hand, by a housing cover 4b which closes off the housing main body. The housing 4 is cooled by way of a cooling arrangement, for example by integrated coolant lines. Here, water is preferably used as coolant.

A comb-like cooling plate 24 is arranged along the inner circumference of the encapsulation 18. During motor operation, a cooling fluid, for example in the form of an air or liquid flow, is conducted past the cooling plate 24, such that heat is removed from the encapsulation 18 via the cooling plate 24 to the interior of the stator 12.

Figure 4:
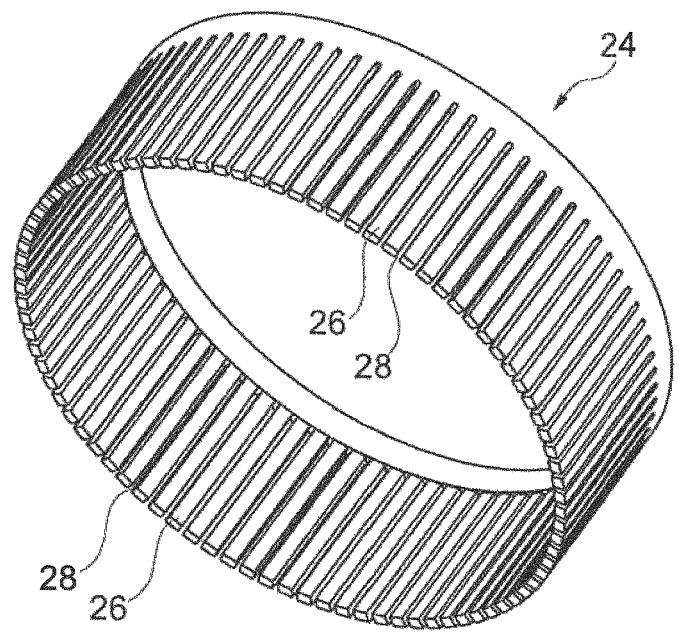
FIG. 4 shows the cooling plate in a perspective illustration.

The circular-ring-shaped cooling plate 24 illustrated individually in FIG. 4 is produced in particular from an aluminum material, for example by a punching and bending process. The cooling plate 24 is at least partially integrated or embedded in the encapsulation 18, such that as small a distance as possible is realized between the winding head 16 and the cooling plate 24. In this way, a particularly effective transfer of heat from the winding heads 16 to the respective cooling plate 24 is ensured, which has an advantageous effect on the cooling of the winding heads 16.

The cooling plate 24 has a number of plate teeth 26 extending axially to the respectively opposite housing face side 22. The lamellar plate teeth 26 are created by slot-shaped recesses 28 of the cooling plate 24. By way of example, in FIG. 2, only in each case three stator grooves 14, plate teeth 26 and recesses 28 are connected by a reference designation.

By means of the recesses 28, segmentation of the cooling plate 24 is realized, by which the formation of induced eddy currents owing to the magnetic rotating field during operation is reduced or prevented. In this way, a generation of heat in the cooling plate 16 is reduced, such that improved cooling of the winding heads 16 is realized. The clear width of the recesses 28 is in this case filled for example with encapsulation material 20 during the course of the integration or embedding of the cooling plate 24 into the encapsulation 18, such that electrically insulating material is arranged substantially between the plate teeth 26.

In a suitable dimensioning, the cooling plate 24 has, for example, a radial plate thickness of 3 mm and an axial plate height of approximately 30 mm. In the case of such an embodiment, the segmentation is dimensioned for example to approximately 6 mm, which means that the width of the plate teeth 26 and/or the clear width of the slot-shaped recesses 28 between the plate teeth 26 is dimensioned to be 6 mm.

The invention is not restricted to the exemplary embodiment described above. Rather, other variants of the invention may also be derived therefrom by a person skilled in the art without departing from the subject matter of the invention. In particular, it is furthermore the case that all individual features described in conjunction with the exemplary embodiment may also be combined with one another in some other way without departing from the subject matter of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

2 Electric machine
4 Housing

4a Housing base
4b Housing cover
6 Rotor
8 Motor shaft
10 Bearing
12 Stator
14 Stator groove
16 Winding head
18 Encapsulation
20 Encapsulation material
22 Housing face side
24 Cooling plate
26 Plate tooth
28 Recess
D Axis of rotation
A Axial direction

What is claimed is:

1. An electric machine, comprising:
a housing;
a stator arranged within the housing;
a rotor arranged fixedly on a motor shaft, the stator surrounding the rotor and having a rotating-field winding which forms one winding head at each face side of the stator, wherein the winding heads at the face sides are embedded in a thermally conductive encapsulation material, the thermally conductive encapsulation material is, along an outer circumference of each winding head, in thermal contact with the housing; and
a segmented cooling plate arranged on an inner circumference of each of the encapsulated winding heads, wherein the cooling plate is a separate structure from the housing, wherein the cooling plate is embedded in the encapsulation material, and wherein the segmentation of the cooling plate is plate teeth which are formed by slot-shaped recesses in a surface of the cooling plate.

2. The electric machine as claimed in claim 1, wherein heat is removed from the housing by a cooling arrangement.

3. The electric machine as claimed in claim 2, wherein the cooling arrangement is a water or oil cooling arrangement.

4. The electric machine as claimed in claim 1, wherein the cooling plate is made of an aluminum material.

5. An electric machine, comprising:
a housing;
a stator arranged within the housing;
a rotor arranged fixedly on a motor shaft, wherein the stator surrounds the rotor and has a rotating-field winding which forms a winding head at each face side of the stator;
a thermally conductive encapsulation material in which at least one winding head is embedded, the encapsulation material being in thermal contact with the housing along an outer circumference of the winding head; and
a segmented cooling plate arranged on an inner circumference of the thermally conductive encapsulation material in which the winding head is embedded, wherein the cooling plate is a separate structure from the housing, wherein the cooling plate is embedded in the encapsulation material, and wherein the segmentation of the cooling plate is plate teeth which are formed by slot-shaped recesses in a surface of the cooling plate.

6. A motor vehicle, comprising an electric machine as claimed in claim 1.

7. The motor vehicle as claimed in claim 6, wherein the motor vehicle is an electric or hybrid motor vehicle.

* * * * *